Nov. 22, 1955　　　　W. A. BAILEY　　　2,724,469
COMBINED BRAKE PEDAL AND THROTTLE CONTROL ASSEMBLY
Filed Jan. 14, 1953

INVENTOR.
William A. Bailey,
BY Victor J. Evans & Co.
ATTORNEYS

United States Patent Office 2,724,469
Patented Nov. 22, 1955

2,724,469

COMBINED BRAKE PEDAL AND THROTTLE CONTROL ASSEMBLY

William A. Bailey, Leland, Miss.

Application January 14, 1953, Serial No. 331,263

2 Claims. (Cl. 192—3)

This invention relates to a vehicle, and more particularly to a combination brake pedal and accelerator assembly for a vehicle.

The object of the invention is to provide a combined brake pedal and accelerator for a vehicle which will enable the driver to simultaneously maintain his or her foot in constant and direct contact with the brake pedal as well as the accelerator pedal.

Another object of the invention is to provide a brake pedal and accelerator pedal which can be readily installed in present day vehicles whereby the driver will be able to operate the vehicle with greater safety and wherein the possibility of skidding or turning over is minimized, the present invention enabling the operator to use the brake or accelerator independently or together.

A further object of the invention is to provide a brake pedal and accelerator pedal which is extremely simple and inexpensive to manufacture.

Other objects and advantages will be apparent during the course of the following description.

In the accompanying drawings, forming a part of this application, and in which like numerals are used to designate like parts throughout the same:

Figure 1:
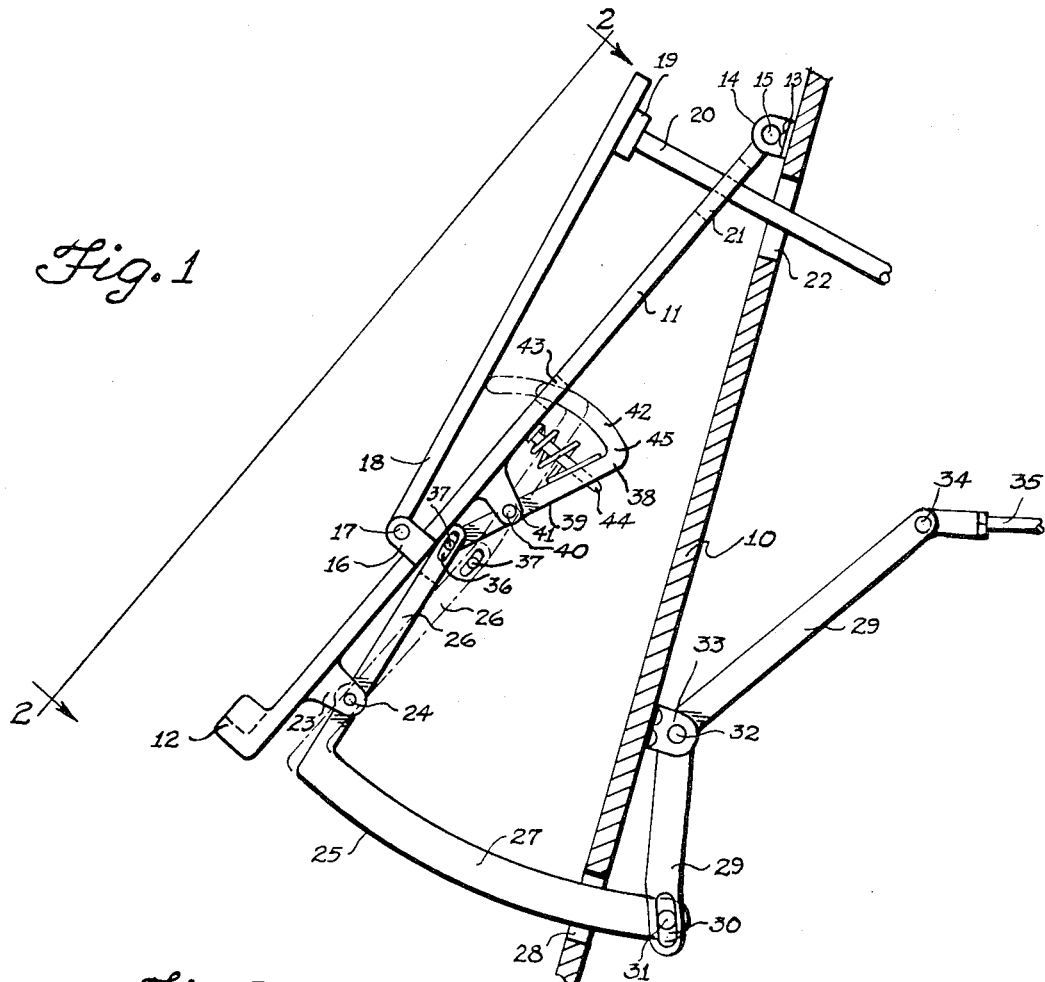
Figure 1 is a side elevational view showing the brake and accelerator pedal of the present invention, and with the floor board in section.
Figure 2:
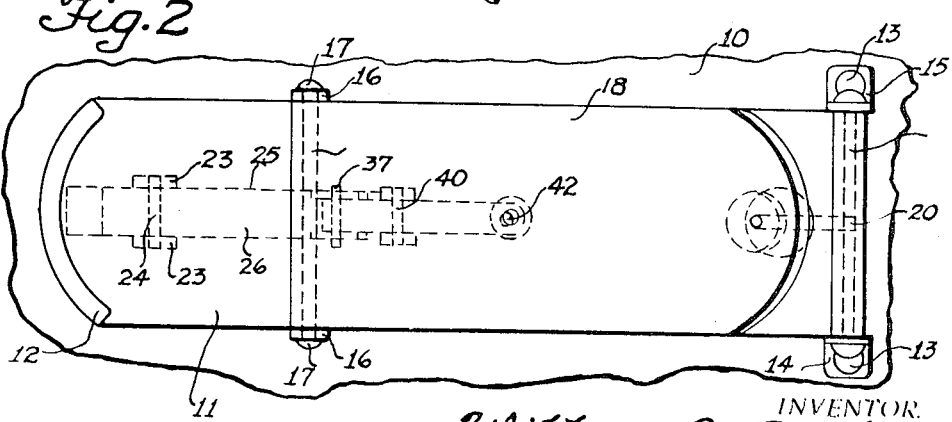
Figure 2 is a top plan view showing the present invention.

Referring in detail to the drawings, the numeral 10 designates a portion of the vehicle floor board, and a body member or brake pedal 11 has its upper end pivotally connected between a pair of clips 14 by means of a pin 15. The clips 14 may be secured to the floor board 10 in any suitable manner, as for example by rivets 13. The other or lower end of the body member 11 is provided with a heel rest 12.

Extending upwardly from the body member 11 and secured thereto is a pair of apertured ears 16. A pin 17 extends between the pair of ears 16 and the pin 17 serves to pivotally connect the lower end of an accelerator pedal 18 to the ears 16. Secured to the upper portion of the pedal 18 adjacent the lower surface thereof is a bushing 19 and a rod 20 has one end connected to the bushing 19. The other end of the rod 20 is adapted to be connected to the vehicle carburetor so that by depressing the accelerator pedal 18 the supply of gasoline to the engine can be increased to thereby increase the speed of the vehicle. An opening 21 is provided in the body member 11, and there is provided an opening 22 in the floor board 10 and the rod 20 is adapted to slidably project through the openings 21 and 22.

Depending from the lower surface of the body member 11 and secured thereto or formed integral therewith is a pair of spaced parallel apertured lugs 23. A pin 24 extends between the lugs 23, and the pin 24 serves to pivotally connect an L-shaped lever or bell crank 25 to the body member 11. The lever 25 includes a first arm 26 and a second arm 27, and there is provided an opening 28 in the floor board 10 for the slidable projection therethrough of the arm 27. The lever 25 is adapted to be connected to the vehicle brake cylinder and any suitable linkage can be utilized for connecting these parts together. As shown in the drawing, a link, lever or bell crank 29 is provided with a slot 30 for receiving a pin 31 which extends from the arm 27, and a pin 32 pivotally connects the link or bell crank 29 to support members 33 which are secured to the undersurface of the floor board 10. A pin 34 connects the other end of the link or bell crank 29 to a rod 35 that leads to the brake cylinder, Figure 1.

The arm 26 of the lever 25 is provided with a slot 36, and a pin 37 extends through the slot 36 and into engagement with a first section 39 of an L-shaped lever or bell crank 38. The section 39 of the lever 38 is pivotally connected to brackets 41 by means of a pin 40, the brackets 41 depending from the lower surface of the body member 11.

The lever 38 further includes a second section 42 which has its end mounted for movement into and out of engagement with the undersurface of the accelerator pedal 18, the section 42 being slidably positioned in an opening 43 in the body member 11.

A coil spring 45 is interposed between the section 39 and the body member 11, and the coil spring 45 has projecting therethrough a guide pin 44, one end of the guide pin 44 being secured to the undersurface of the body member 11. A suitable opening 46 is provided in the section 39 for the slidable projection therethrough of the guide pin 44.

From the foregoing, it is apparent that a combination brake and accelerator pedal has been provided. The assembly of the present invention can be used on various vehicles such as automobiles or trucks and the present invention can be used in conjunction with brake systems that are now in use. With the present device, the foot of the operator is always in direct contact with the brake pedal as well as the accelerator pedal. The brake pedal or body member 11 is arranged at approximately 30° with the horizontal but this angular position can be varied as desired.

In use, when the brake is applied, that is when pressure is applied to the body member 11, the lower or back end of the lever 25 will be forced up in a clockwise direction so that it contacts the brake pedal 11. This short movement will move the pin 37 to thereby cause counterclockwise pivotal movement of the lever 38 about the pin 40. This will result in the spring 45 being depressed and also the free end of the section 42 will engage the undersurface of the gas pedal 18 to thereby raise the gas pedal and reduce the motor or engine power. If the operator desires to keep the motor under full power to reduce the chance of skidding or turning over, as when the vehicle is operating on ice or turning a sharp corner, pressure can be applied with the toe which will hold the lever 38 and the lever 25 in their original positions while simultaneously applying the brake pedal or body member 11.

Furthermore, when the brake has been applied in the ordinary course of driving and the accelerator pedal 18 is in its upper position, it is also possible to hold the brake and apply pressure to the gas pedal 18 by letting up on the heel slightly while at the same time forcing the gas pedal 18 down with the toe. This movement will maintain the lever 25 and linkage leading to the brake cylinder in its original applied position.

The elongated slot 36 in the arm 26 compensates for the difference in the arcs which the levers 25 and 38 travel while moving up and down. The hole or opening 46 in the lever 38 permits the spring guide 44 to project therethrough. Thus, it will be seen that by using the reflex action of the driver of the vehicle, the present invention will eliminate many accidents to thereby effect a saving in damage to vehicles and also prevent loss of life. When the present invention is being used, the driver always has his or her foot in the same ready position so that the brakes can be applied without moving the foot. The parts are normally held in the solid line position of Figure 1 by the spring 45. However, when the driver of the vehicle presses on the brake pedal 11, the bell crank 25 will pivot about the pivot pin 24 and the bell crank 25 will move from the solid line position of Figure 1 to the broken line position of Figure 1 as the result of the usual or normal resistance in the brake cylinders. Of course, if the brake pedal 11 were moved far enough towards the floor board 10, the lower projecting end of the bell crank 38 would contact the floorboard 10 to cause the parts to move from the solid line position of Figure 1 to the broken line position of Figure 1.

I claim:

1. In combination, a vehicle including a floor board, a body member having its upper end pivotally connected to said floor board, a pair of spaced parallel apertured ears extending upwardly from said body member and secured thereto, an accelerator pedal having its lower end pivotally mounted between said pair of ears, a rod connected to the upper end of said pedal and adapted to be connected to a vehicle carburetor, there being openings in said pedal and floor board for the slidable projection therethrough of said rod, a pair of spaced parallel apertured lugs extending downwardly from the lower portion of said body member, a first L-shaped lever pivotally connected to said lugs and including a first arm and a second arm, there being an opening in said floor board for the projection therethrough of said second arm, means adapted to connect said second arm to the vehicle brake cylinder, apertured brackets depending from said body member, a second lever having a substantially L-shape pivotally connected to said brackets and including a first section pivotally connected to said first arm, and a second section having its free end mounted for movement into and out of engagement with the lower surface of said accelerator pedal, and resilient means for urging said second section away from said accelerator pedal, there being an opening in said body member for the slidable projection therethrough of said second section.

2. In combination, a vehicle including a floor board, a body member having its upper end pivotally connected to said floor board, a pair of spaced parallel apertured ears extending upwardly from said body member and secured thereto, an accelerator pedal having its lower end pivotally mounted between said pair of ears, a rod connected to the upper end of said pedal and adapted to be connected to a vehicle carburetor, there being openings in said pedal and floor board for the slidable projection therethrough of said rod, a pair of spaced parallel apertured lugs extending downwardly from the lower portion of said body member, a first L-shaped lever pivotally connected to said lugs and including a first arm and a second arm, there being an opening in said floor board for the projection therethrough of said second arm, means adapted to connect said second arm to the vehicle brake cylinder, apertured brackets depending from said body member, a second lever having a substantially L-shape pivotally connected to said brackets and including a first section pivotally connected to said first arm, and a second section having its free end mounted for movement into and out of engagement with the lower surface of said accelerator pedal, and resilient means for urging said second section away from said accelerator pedal, there being an opening in said body member for the slidable projection therethrough of said second section, a heel rest positioned on the lower end of said body member, said resilient means comprising a coil spring interposed between said first section and said body member, and a guide pin extending through said coil spring.

References Cited in the file of this patent

UNITED STATES PATENTS

| 1,520,335 | Davis | Dec. 23, 1924 |
| 1,549,348 | Davis | Aug. 11, 1925 |
| 1,724,596 | James | Aug. 13, 1929 |
| 2,124,900 | Winters | July 26, 1938 |
| 2,553,080 | Ching | May 15, 1951 |

FOREIGN PATENTS

| 409,424 | Italy | Feb. 15, 1945 |